Patented June 3, 1930

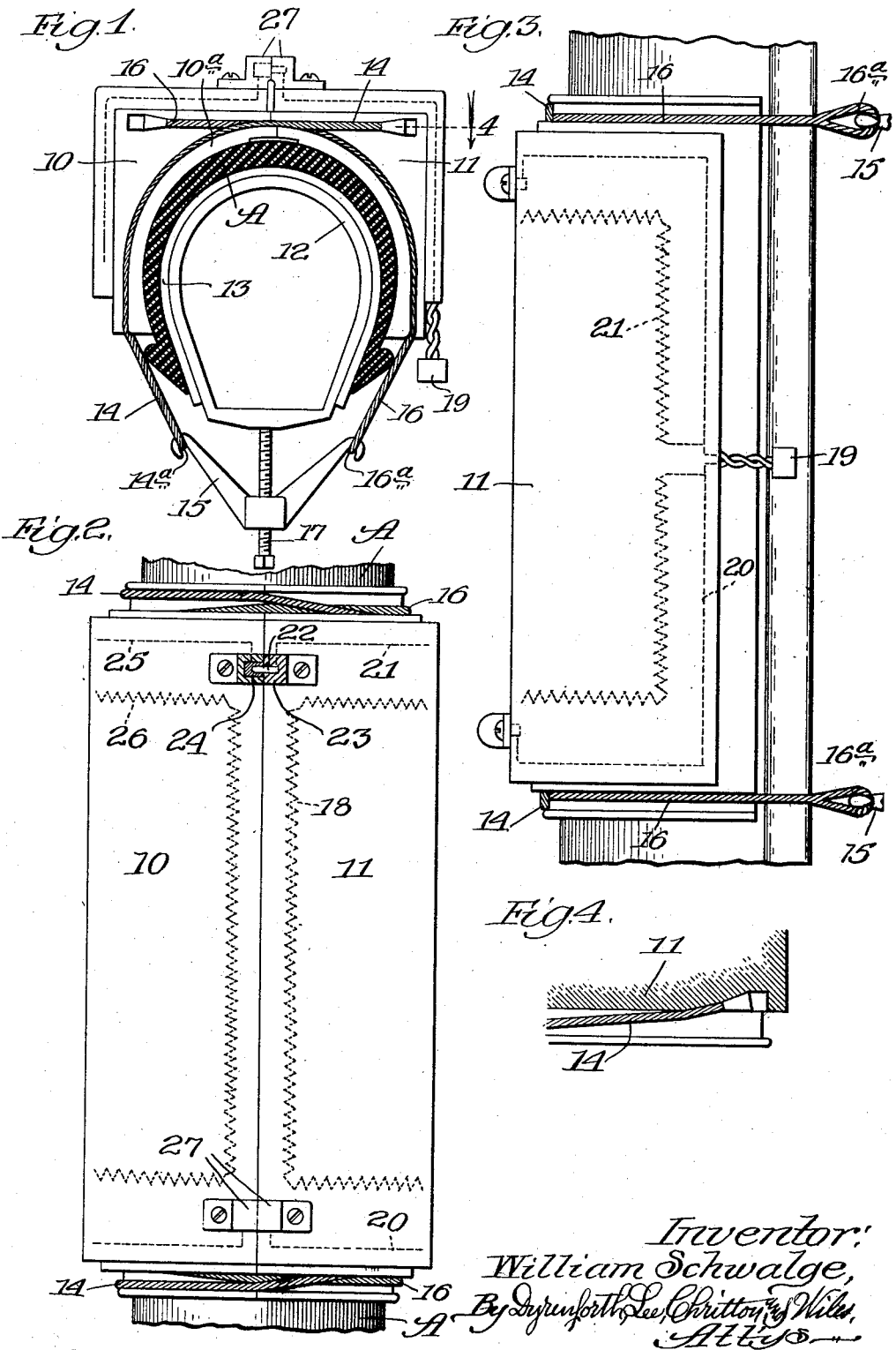

1,761,687

UNITED STATES PATENT OFFICE

WILLIAM SCHWALGE, OF ELMHURST, ILLINOIS

VULCANIZER FOR AUTOMOBILE TIRES

Application filed March 29, 1928. Serial No. 265,703.

This invention relates to vulcanizer for automobile tires and the like and is fully described in the following specification and shown in the accompanying drawings, in which—

Figure 1 is an end elevation of the device applied to an automobile tire;

Fig. 2 is a top plan view of the same;

Fig. 3 is a side elevation; and

Fig. 4 is a partial section on the line 4 of Fig. 1.

The embodiment illustrated comprises a vulcanizer casing made of two sections 10 and 11 which are supported along a longitudinal line. The interior of these sections is adapted to closely fit and form the contour of the outer surface of the automobile casing A, which is shown in cross section in Fig. 1. Within the tire A is placed a metal shoe 12 which is hollow and preferably made of cast iron. Between the shoe 12 and the tire A is placed a cushion 13 of storage rubber or the like. By using cushions of different thicknesses, tires of various sizes may be vulcanized in a single vulcanizer.

The section 11 is provided at each end with a flexible member 14 which is secured thereto, this end extending over the ledge 10ª on the section 10. The lower end of the flexible member 14 is provided with an eyelet 14ª which is adapted to fit over the hooked end of the yoke 15.

The member 10 is likewise provided with a similar flexible member 16 which has an eyelet 16ª which engages a hook on the opposite end of the yoke 15. This yoke is tapped to receive a cap screw 17 which is adapted to bear on the under side of the shoe 12.

Thus, it will be seen that by tightening the screw 17 in the yoke 15 at each end of the vulcanizer, the shoe 12 is forced up into the vulcanizer, thereby compressing the tire A firmly between the shoe and the vulcanizer sections 10 and 11. At the same time, the pull on the flexible members 14 and 16 draws the two vulcanizer sections 10 and 11 together.

The section 11 is provided with an electrical heating element 18 which is connected to a suitable terminal 19 which, in turn, is adapted to be connected to a suitable source of electrical energy. Leads 20 and 21 (Fig. 3) are also connected to the terminal 19 and these are connected to suitable contact members 22 which are carried by insulators 23. The contact member 22 fits into a suitable metal socket 24 which is connected in series with the heating element 26. A similar set of contacts 27 is provided at the opposite end by which current is returned to the terminal 19 through the lead 20.

Thus, it will be seen that I have provided a very simple and efficient form of vulcanizer which can readily be placed over an automobile tire and firmly secured thereon during the vulcanizing process by the simple act of tightening the two cap screws 17.

While I have shown and described but a single embodiment of this invention, it is to be understood that it is capable of many modifications. Changes therefore in the construction and arrangement may be made which do not depart from the spirit and scope of the invention as disclosed in the appended claim.

I claim:

In a vulcanizer for automobile tires, a casing made up of two sections adapted to fit around an automobile tire, a shoe adapted to conform to the inner surface of said tire, means in said sections for heating them, flexible members secured to each section and passing around the other, and means for tensioning these member and simultaneously pressing said shoe inwardly toward said sections.

In testimony whereof, I have hereunto set my hand this 15th day of February, A. D., 1928.

WILLIAM SCHWALGE.